United States Patent
Yeom et al.

(10) Patent No.: US 8,190,658 B2
(45) Date of Patent: May 29, 2012

(54) INTELLIGENT COMPUTING DEVICE AGENT SYSTEM FOR AUTOMATIC RECOGNITION OF MULTI USER COMPUTING ENVIRONMENT AND INFORMATION SHARING SETUP

(75) Inventors: Ki Won Yeom, Gyeonggi-do (KR); Ji Hyung Park, Seoul (KR); Joong Ho Lee, Gyeonggi-do (KR); Seung Soo Lee, Seoul (KR); Ju Il Eom, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 514 days.

(21) Appl. No.: 12/282,824

(22) PCT Filed: Mar. 14, 2006

(86) PCT No.: PCT/KR2006/000900
§ 371 (c)(1),
(2), (4) Date: Sep. 12, 2008

(87) PCT Pub. No.: WO2007/105838
PCT Pub. Date: Sep. 20, 2007

(65) Prior Publication Data
US 2009/0083234 A1    Mar. 26, 2009

(51) Int. Cl.
*G06F 12/00* (2006.01)
*G06F 17/30* (2006.01)
(52) U.S. Cl. ........................ 707/825; 709/239
(58) Field of Classification Search ............ None
See application file for complete search history.

(56) References Cited

U.S. PATENT DOCUMENTS

| | | | |
|---|---|---|---|
| 5,966,451 A | 10/1999 | Utsumi | |
| 6,006,105 A * | 12/1999 | Rostoker et al. | 455/552.1 |
| 6,400,996 B1 * | 6/2002 | Hoffberg et al. | 700/83 |
| 6,560,511 B1 | 5/2003 | Yokoo et al. | |
| 6,775,706 B1 * | 8/2004 | Fukumoto et al. | 709/230 |
| 6,782,474 B1 * | 8/2004 | Ylonen | 713/162 |
| 7,089,083 B2 | 8/2006 | Yokoo et al. | |
| 7,120,455 B1 * | 10/2006 | Chen et al. | 455/466 |
| 7,194,278 B1 * | 3/2007 | Cook | 455/461 |
| 7,853,703 B1 * | 12/2010 | McBarron et al. | 709/228 |

(Continued)

FOREIGN PATENT DOCUMENTS
JP    2000-035930    2/2000
(Continued)

OTHER PUBLICATIONS

PCT International Search Report, PCT International Patent Application No. PCT/KR2006/000900, Nov. 30, 2006.

(Continued)

*Primary Examiner* — Pierre Vital
*Assistant Examiner* — Augustine Obisesan
(74) *Attorney, Agent, or Firm* — Fenwick & West LLP

(57) ABSTRACT

An intelligent computing device agent system for auto recognition of a computing environment of multi-user and optimum information exchange configuration is provided. In the computing device agent system automatically detects the user's computing environment and intelligently makes network access configuration and an information exchange type required between interacting computing devices identical to each other, so that fast, convenient interaction is carried out without complex network configuring or multi-step environment configuring for information exchange.

6 Claims, 4 Drawing Sheets

U.S. PATENT DOCUMENTS

| | | | |
|---|---|---|---|
| 2001/0003835 A1* | 6/2001 | Watts | 709/318 |
| 2002/0038387 A1* | 3/2002 | Fuiks et al. | 709/313 |
| 2002/0069282 A1* | 6/2002 | Reisman | 709/227 |
| 2002/0133330 A1* | 9/2002 | Loisey et al. | 703/27 |
| 2002/0133588 A1* | 9/2002 | Doyle et al. | 709/224 |
| 2003/0027465 A1* | 2/2003 | Trossell et al. | 439/894 |
| 2003/0100308 A1* | 5/2003 | Rusch | 455/445 |
| 2005/0026809 A1* | 2/2005 | Kvita et al. | 510/515 |
| 2005/0044280 A1* | 2/2005 | Reisman | 710/1 |
| 2005/0138194 A1* | 6/2005 | Lu et al. | 709/230 |
| 2005/0190789 A1* | 9/2005 | Salkini et al. | 370/466 |
| 2006/0022048 A1* | 2/2006 | Johnson | 235/462.1 |
| 2006/0026269 A1* | 2/2006 | Sadovsky et al. | 709/222 |
| 2006/0117164 A1* | 6/2006 | Coxe et al. | 712/15 |
| 2006/0123128 A1* | 6/2006 | Feingold et al. | 709/230 |
| 2006/0150159 A1* | 7/2006 | Fellenstein et al. | 717/126 |
| 2007/0204089 A1* | 8/2007 | Proctor | 710/301 |
| 2008/0108340 A1* | 5/2008 | Karstens | 455/418 |
| 2008/0172494 A1* | 7/2008 | Kim et al. | 709/230 |

FOREIGN PATENT DOCUMENTS

| | | |
|---|---|---|
| JP | 2001-103066 | 4/2001 |
| JP | 2005-020184 | 1/2005 |
| KR | 1998-069891 A | 10/1998 |
| KR | 2001-0053322 A | 6/2001 |
| KR | 2002-0043994 A | 6/2002 |
| KR | 2004-0061760 A | 7/2004 |

OTHER PUBLICATIONS

PCT International Preliminary Report on Patentability, PCT International Patent Application No. PCT/KR2006/000900, Jul. 4, 2008.

* cited by examiner

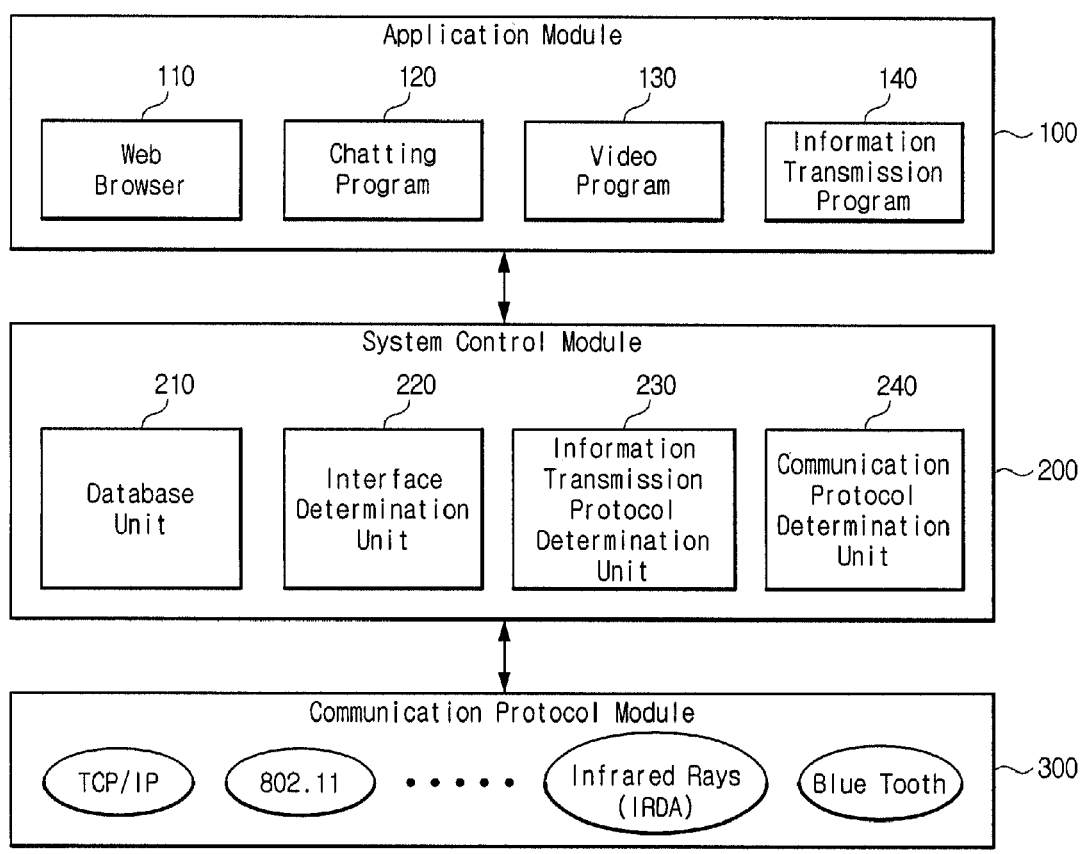
[Fig. 1]

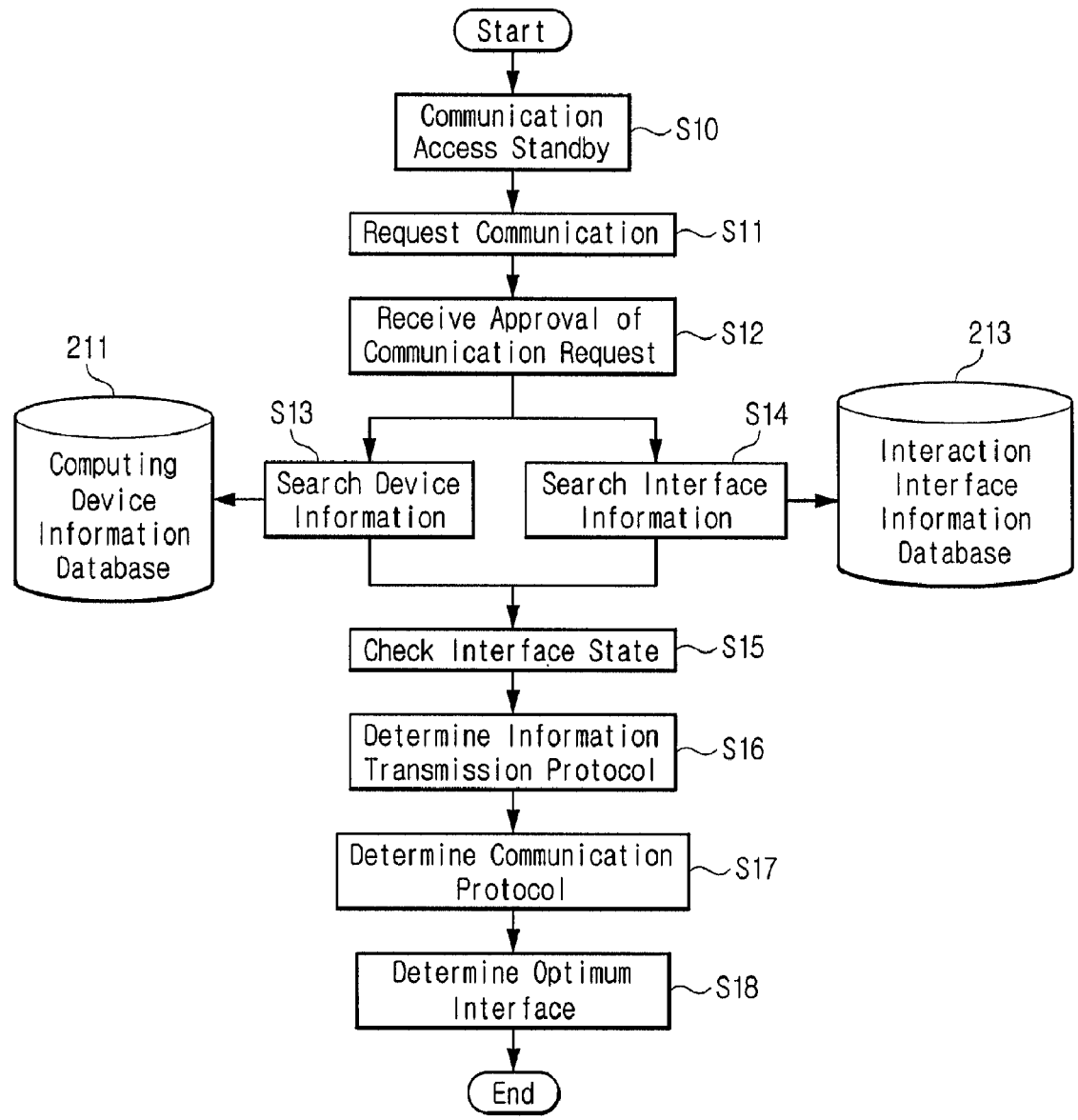

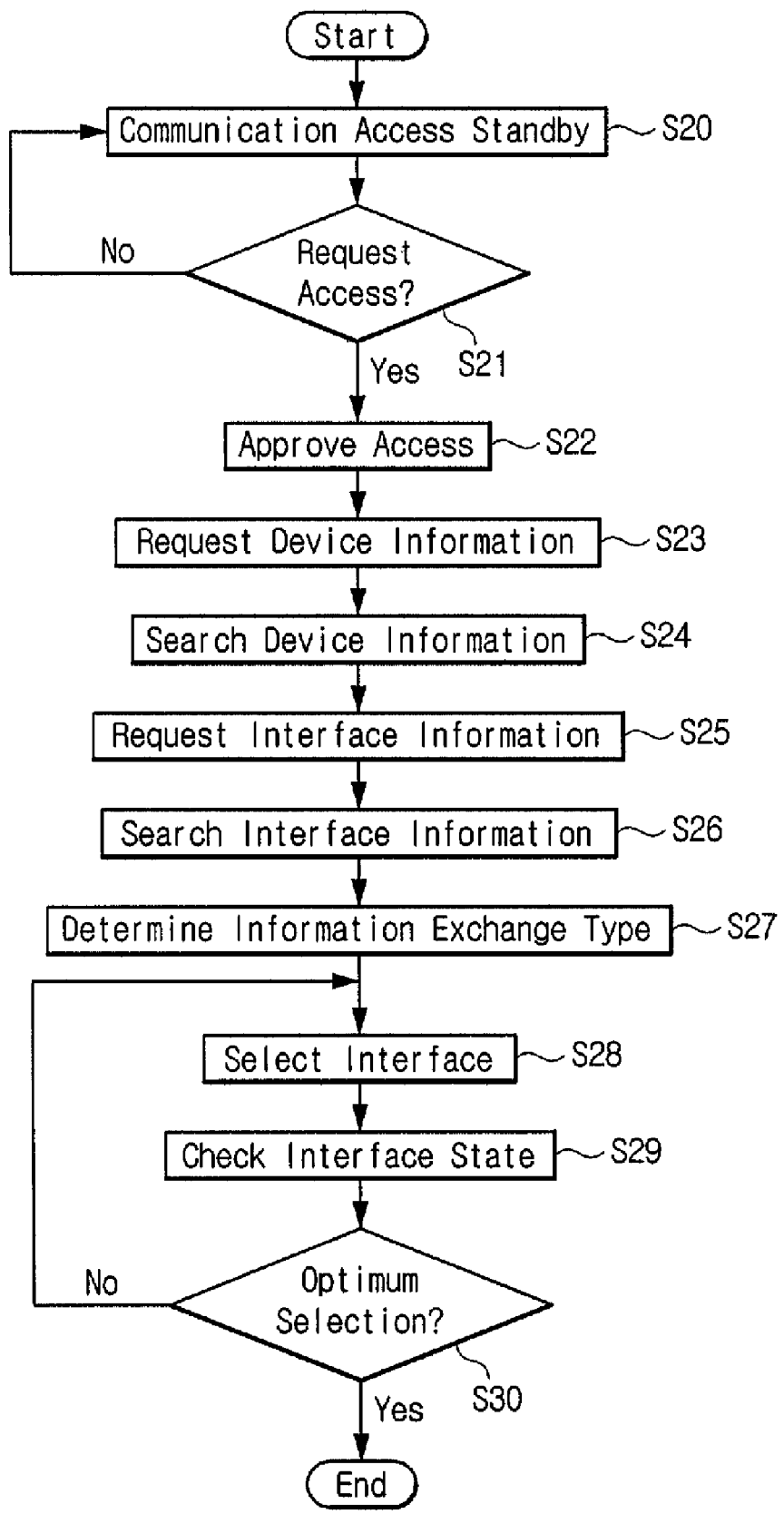
[Fig. 3]

[Fig. 4]
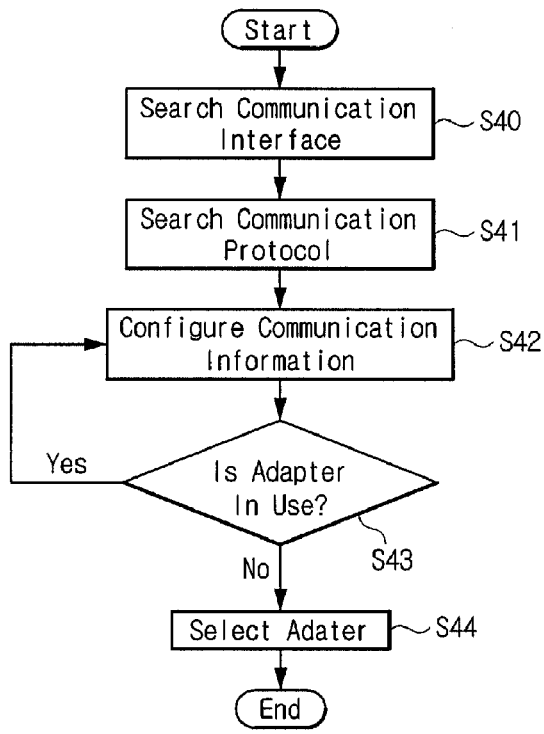
[Fig. 5]
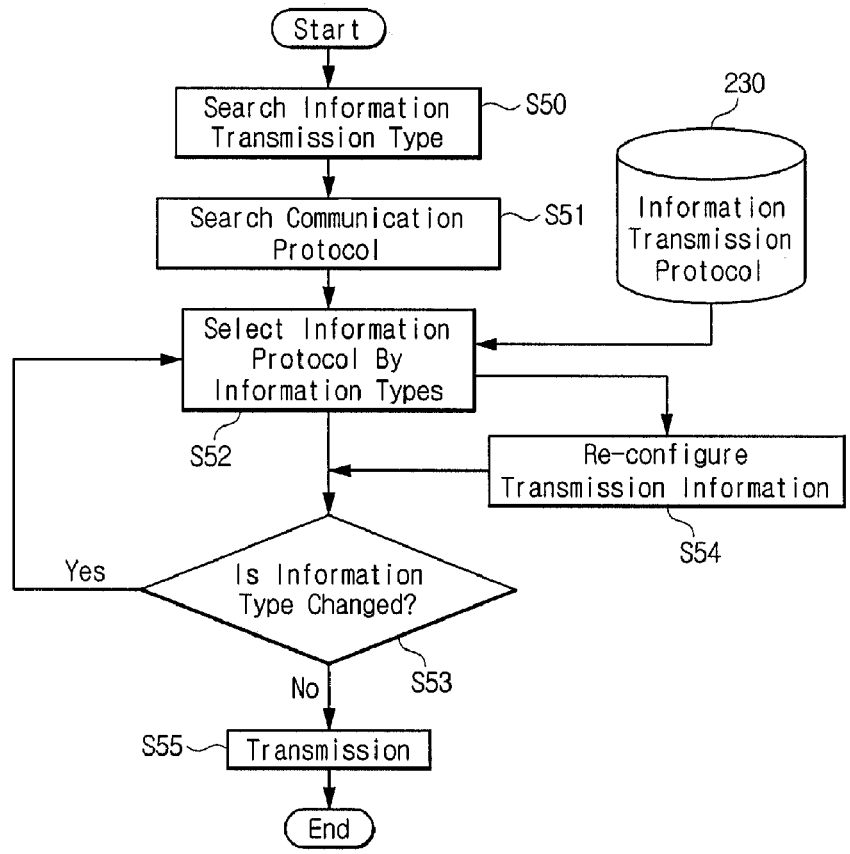

INTELLIGENT COMPUTING DEVICE AGENT SYSTEM FOR AUTOMATIC RECOGNITION OF MULTI USER COMPUTING ENVIRONMENT AND INFORMATION SHARING SETUP

TECHNICAL FIELD

The present invention relates to an intelligent computing device agent system which intelligently connects communication means of users in a network and provides information suitable for a computing environment of the users, and more particularly to an intelligent computing device agent system for auto recognition of a computing environment of multi-user and optimum information exchange configuration which automatically configures communication and information exchange mode and intelligently selects an information transmission protocol required for information exchange according to different computing environments and network access types, thereby intelligently processing environment configuration required for information expression with same level under whichever computing device and network access are used.

BACKGROUND ART

Typically, the communication mates in a network always transmit the same type or size information irrespective of whichever computing device (e.g. PDA, PC, or notebook) or network the communication counterpart uses.

In such a transmission method, in the case that a user uses a general computer and the others uses a compact device such as PDA or the like, the devices of both users display information in different manner from each other. Thus, one device may display information correctly whereas the other device may display information (e.g. arrangement of pictures, web browser, or the like) differently, or otherwise, display information throughout a long time, or does not display information itself, thereby being useless.

Moreover, for gaining access to the Internet or a general network, inconveniently, a user should configure a complex access process, recognize the communication counterpart's access address for interaction with him/her, and carry out downloading of a communication program, log-in, and environment configuration.

DISCLOSURE OF INVENTION

Technical Problem

Accordingly, the present invention has been made to solve the above-mentioned problems occurring in the prior art, and an object of the present invention is to provide an intelligent computing device agent system which allows a user to get free from complex access configuration between a device and a network, and intelligently recognizes computing environments and network access of the communication counterpart and correspondingly optimizes an information exchange manner between communication mates, rendering the users constantly contacting information in a same level even whichever computing device the counterpart uses.

Technical Solution

In order to accomplish the above object, there is provided a computing device agent system comprising: a database unit receiving and storing counterpart's information on a computing device and an interface device applicable to the device; an interface-determination unit recognizing the state of the computing device and the interface and determining interface means; information transmission protocol determination unit searching an information transmission protocol suitable for the interface means determined by the interface-determination unit and determining an information transmission protocol required for bidirectional information transmission; and a communication protocol determination unit determining a communication device and a protocol required for network access between the interface means.

The database unit may include: a device information database section storing therein physical information, an operating system, a device ID, or a support communication means of the computing device; and an interface information database section storing therein information on the type and the state of the interface supportable and available in the computing device and the operating system, respectively.

The interface determination unit may select an interface required for interaction by the method comprising the steps of: when receiving a request for communication access from a communication counterpart's agent system, requesting information on a computing device of the counterpart; searching, from the device information database section, various system configurations and system information required for encoding/decoding that correspond to the counterpart's computing device information received; and searching, from the interface information database section, information on media type and mode required for information output according to the interface types so as to determine a required output mode based on interface information available in the counterpart's agent system.

The selecting method may further comprise the step of comparing the device performance of the selected interface, a size of transmission information, the state of the transmission protocol, the process and output performance of the interface itself, or whether or not available in the counterpart's computing device.

The information transmission protocol may include an information transmission protocol by interfaces transmitting information according to the interface means; and an information protocol by information types sorted into a picture or photograph dedicated protocol, a text information dedicated protocol, and an integrated information dedicated protocol, the integrated information including Internet information.

When transmission information is changed, the information transmission protocol determination unit may select a protocol corresponding to the changed information from the information transmission protocol by information types, reconfigure the transmission information, and transmit the same.

The communication protocol determination unit may determine a communication protocol by a network with a lower layered communication protocol, and may include a communication protocol adapter for supporting a plurality of communication protocols.

The communication protocol adapter may include, as an aggregate, a plurality of protocols required for access of the communication means supported by the respective computing devices.

When a communication module or a driver required for corresponding computing device does not exist, the communication protocol adapter may automatically download the required module or driver from the counterpart's computing device or the Internet.

Advantageous Effects

According to the present invention, the intelligent computing device agent system allows a user to get free from complex access configuration between a device and a network, and intelligently recognizes computing environments and network access of the communication counterpart and correspondingly optimizes an information exchange manner between communication mates, rendering the users constantly contacting information in a same level even whichever computing device the counterpart uses.

BRIEF DESCRIPTION OF THE DRAWINGS

The above and other objects, features and advantages of the present invention will be more apparent from the following detailed description taken in conjunction with the accompanying drawings, in which:

FIG. 1 is a view illustrating the framework of a computing system in which an agent system according to an embodiment of the present invention is connected to a computing device of a user in a network to carry out intelligent interaction therebetween;

FIG. 2 is a general algorithm for determining an optimum interaction method through an intelligent connection with a counterpart's agent system according to the present invention;

FIG. 3 is an algorithm for determining an optimum interface according to the present invention;

FIG. 4 is a communication configuration algorithm for determining an adapter required for communication configuration according to the present invention; and FIG. 5 is an algorithm for coping with the case where transmission information is changed in its type according to the present invention.

BEST MODE FOR CARRYING OUT THE INVENTION

Hereinafter, preferred embodiments of the present invention will be described with reference to the accompanying drawings.

FIG. 1 is a view illustrating the framework of a computing system in which an agent system according to an embodiment of the present invention is connected to a computing device of a user in a network to carry out intelligent interaction therebetween.

In the embodiments of the invention, a computing device includes a personal computer (PC), a personal digital assistant (PDA), a notebook, or the like, and a communication network includes the Internet, a local area network (LAN), a wireless network (802.11), or the like.

In FIG. 1, the computing system according to an embodiment of the invention includes an application module, a system control module, and a communication protocol module.

The application module 100 is a user program available in the embodiment of the invention, which generally includes a web browser 110 for using an application based on the Internet, a chatting program 120 and a video chatting program 130 possibly having a messenger function and a chatting function, and a information transmission program 140 for data transmission.

The system control module 200 is an agent system of the invention, which includes a database unit 210, an interface determination unit 220, an information transmission protocol determination unit 230, and a communication protocol determination unit 240.

The database unit 210 can store information of a user's computing device itself and an application for interaction available in the computing device. To this end, the database unit 210 consists of a device information database section 211 and an interface information database section 213.

The device information database section 211 is a storage unit for storing physical information of the user's computing device, which unit, upon initial access to the counterpart, exchanges information of the computing devices between themselves and stores the same, so that upon the next access, a user uses information of the corresponding devices through extraction from the database unit. The device information database section 211 includes a device type part, a device operating system (OS) part, a device ID part, a support communication means part, and the like. The device type part stores therein the types of the respective computing devices, i.e., information such as PC, notebook, PDA, etc. The device OS part stores therein information on OS used in the respective devices. The device ID part stores therein an inherent ID for identification of an device and a user. The support communication means part stores therein a list of devices capable of communicating via wire and wireless network, Bluetooth, infrared rays, or the like.

The interface information database section 213 includes information on interface means supportable and available by and in the respective devices and OS thereof. The interface information database section 213 stores therein information on available interface means including an Internet web browser, a user-defined chatting and communication program, a messenger, a video chatting program, a voice communication program, etc. In addition, it records the state of the interface means at that time of access. For example, if an device is in use, it displays "in use state", and if not, it displays "standby state".

The interface determination unit 220 includes an algorithm for determining an optimum interface means according to device information of interacted devices, a network access type, and an interface type. The interface determination unit 220 searches device information of the corresponding computers requesting access from the device information database section to thereby extract information of the corresponding device. It searches a list of interfaces supported by the counterpart's computing device referring to type of device information and OS of the corresponding device, and extracts a list of interfaces available in the corresponding device. It determines an optimum interface capable of quickly transmitting and outputting information according to network access types in the extracted interface information without loss of information expression.

The information transmission protocol determination unit 230 includes various information transmission protocols by interfaces or information types. The information protocol by interfaces is an information transmission protocol according to interface means, and the protocol by information types is divided into an information transmission protocol, an information type of which is picture or photograph-dedicated, a text information transmission protocol, an integrated information protocol such as an Internet information transmission protocol, and the like. The protocol determination unit 230 searches, among various information transmission protocols, an information transmission protocol suitable for the interface determined by the interface determination unit, and determines the same as an information transmission protocol required for bidirectional information transmission.

The communication protocol determination unit 240 recognizes what network means be available to a user in the communication protocol module, and determines a network device and a protocol required for intelligent network access. The communication protocol determination unit 240 determines a communication protocol via communication with a lower layer communication protocol. To support various communication protocols, the present invention adopts a communication protocol adapter, i.e., a virtual aggregate of communication protocols.

That is, the protocols required for the connection of the network means supported by the respective computing devices are provided into an aggregate in which a communication module and a driver for network connection are included. Thus, if a communication module and a driver required in a corresponding device do not exist upon the network connection between the devices, the connection is configured by automatically downloading the required module and driver from the counterpart's computer or the Internet, etc.

The communication protocol module 300 carries out communication via TCP/IP, wireless network (802.11), infrared rays (IRDA), Bluetooth, etc.

Table 1 shows information that is required for communication between the present agent system and other agent system in the network for interaction therebetween. The information is collected from the corresponding agent system.

TABLE 1

| No. | computing device Type | OS Type | Network Support Information | Device ID |
|---|---|---|---|---|
| 1 | PDA | Windows CE | Non | praxxx |
| 2 | PC | Windows XP | Wired Network | stxxxxx |
| 3 | Notebook | Tablet Windows | Wired, Wireless, IRDA | epsxxx |

In Table 1, the information collected from the corresponding agent system for communication includes the index of communicating device (1, 2, 3, . . . ), the computing device type (PC, PDA, notebook, . . . ), the OS type (Windows CE, Windows XP, Tablet Windows, . . . ), the network support information (Bluetooth, wired network, wire/wireless network, IRDA, . . . ), and the device ID of an inherent identifier of an device or user account information.

Table 1 serves as basic information for intelligent information exchange between the present agent system and environment of the counterpart's computing device upon the intelligent network connection therebetween. In Table 1, the device type, OS type, and the device ID are composed of general text or 2 bytes length of string, and the network support information is expressed in binary number according to the type of the presently available communication means. For example, assuming that wired communication is 01, wireless communication is 02, infrared communication (IRDA) is 03, and Bluetooth communication is 04, wired and wireless network support is expressed as 0102.

FIG. 2 is a general algorithm for determining an optimum interaction method through an intelligent connection with a counterpart's agent system according to the present invention.

The agent system according to an embodiment of the invention is always in standby state for request and reception of interaction, upon the occurrence of a request from an agent system desired to communicate, receives the request and automatically recognizes as well device information, interface means, the access type of communication, and the like of the counterpart's computing device, and gains access to the counterpart through determining an optimum interaction interfacing method.

In FIG. 2, the agent system executes a daemon process in standby state for communication with an agent system of other computing device (S10). By the daemon process, acceptance and a request of communication connection with other agent system, and data transmission are carried out.

When the communication connection is requested from other agent system (S11), the daemon process accepts the connection through requesting information on the computing device, such as that shown in Table 1, for intelligent interaction and communication connection with the agent system requesting the connection (S12).

The communication-requesting agent system transmits basic information of its computing device (See Table 1) to the daemon process so as to be configured into an able-to-duplex-communicate state. Through the transmitted information, the agent system searches and collects, from the device information database section 211, diverse system configurations corresponding to received counterpart's device information and system information required for encoding and decoding (S13).

In addition, for interface configuration for interaction, the agent system searches and collects, from the interaction interface information database section 213, information on the media type and manner required for information output by interface types (Winamp, GOM Player, Real Player, Media Player, Flash, and other self-developed interface) in order to determine the required output type according to interface information available in the counterpart's system (S14).

The agent system recognizes the states of the respective interfaces according to the interface information (S15), and determines an information transmission protocol (S16).

Next, the agent system determines an optimum interface (S118) through determining a communication protocol (S17).

Table 2 shows state definitions for indexing state information on media players among the interaction interface types that are operated for each OS type recognized by the agent system.

TABLE 2

| No. | OS Type | Interaction Interface Type | Interface State |
|---|---|---|---|
| 1 | Windows CE | Media Player | In Use |
|  |  | Windamp | Standby |
|  |  | Beta Player | Standby |
| 2 | Windows XP | Media Player | Standby |
|  |  | GOM Player | In Use |
|  |  | Windamp | Standby |
|  |  | Real Player | Standby |
| 3 | Tablet Windows | Media Player | Standby |
|  |  | GOM Player | In Use |
|  |  | Windamp | Standby |
|  |  | Real Player | Standby |

In Table 2, all media players are classified into "in use" and "standby". The "In Use" state means that an interface is presently used by a user or an agent, and the "standby" state means that an interface is able to be used at any time because a resource is not yet assigned.

FIG. 3 is an algorithm for determining an optimum interface according to the present invention.

In FIG. 3, the agent system of the invention executes a daemon process in standby state for communication with an agent system of other computing device (S20). By the daemon process, acceptance and a request of communication connection with other agent system, and data transmission are carried out.

When the communication connection is requested from other agent system (S21), the daemon process accepts the connection (S22), and requests information on the computing device for intelligent interaction and communication connection with the agent system requesting the connection (S23).

The communication-requesting agent system transmits basic information of its computing device to the daemon process so as to be configured into an able-to-duplex-communicate state. Through the transmitted information, the agent system searches and collects, from the device information database section 211, diverse system configurations corresponding to received counterpart's device information and system information required for encoding and decoding (S24) through requesting the same (S23).

In addition, for interface configuration for interaction, the agent system searches and collects, from the interaction interface information database section 213, information on the media type and manner required for information output by interface types (Winamp, GOM Player, Real Player, Media Player, Flash, and other self-developed interface) (S25) through requesting the same (S25) in order to determine the required output type according to interface information available in the counterpart's system.

When interface information is found from the database section 213, an information type is first determined according to the currently available information types (S26). Then, an interface is first selected according to the determined information type (S28).

The state of the interface selected in S28 is then checked (S29). The state checking is carried out by sequentially comparing the performance (comparison of processing performance of a device) and a size of transmission information (comparison of transmission information size) of the selected interface device, a transmission protocol state, processing and output performances (interface performance) of an interface itself, and whether or not the corresponding interface is available in a counterpart's computer.

After the checking of the interface state, it is determined whether the selected interface is optimally selected (S30). If determined to be optimal, information is output via the selected interface.

Here, if it is determined not to be optimal, e.g. on the condition that Open Graphic Library (OpenGL) based information should be output through real-time synchronization, if the performance of the counterpart's computing device cannot cover such operation (no high performance graphic card, no graphic accelerator, no output library, etc.), or cannot process a great amount of information within a certain period (e.g. in the case that serialized data of 10 MB is continuously received and time limit of decoding is 10 ms, the performance does not process the operation so that connection failure or decoding error occurs), it is re-determined which interface is best suitable one according to the information types.

FIG. 4 is a communication configuration algorithm for determining an adapter required for communication configuration according to the present invention.

In FIG. 4, the agent system of the invention searches (via wired network, wireless network, Bluetooth, IRDA, etc.) which communication means is able to communicate with the counterpart (S40).

The protocol required for each searched communication type is downloaded from the communication protocol module described with reference to FIG. 1 (S41), and required connection configuration (communication information configuration) is carried out at the same time (S42). Next, it is determined whether or not the adapter suitable to configured communication information is in use (S43). If the corresponding adapter is in use, the process returns to S42 to re-configure communication information, and if the corresponding adapter is not in use, the corresponding adapter is determined (S44).

Table 3 shows communication protocols required for duplex communication of the agent system of the invention.

TABLE 3

| Information Type | 4 bytes |
|---|---|
| Protocol Control | 4 bytes |
| Transmission Information | 4 Mbytes |
| Interface Control | 4 bytes |
| Sending/Receiving Signal | 4 bytes |
| Encoding/Decoding Information | 8 kbytes |
| Transmission State | 4 bits |

In Table 3, the communication protocol includes the information type (4 bytes, pictures, moving pictures, texts, flash type, etc.), the protocol control (4 bytes, information for each network protocol type), the transmission information (4 MB in the present embodiment, a size of information firstly transmittable within a defined period time), the interface control (4 bytes, information for each interface type), the sending/receiving signal (4 bytes, a signal value for initial network sending/receiving signal upon duplex network communication, e.g. TX/RX, etc.), the encoding/decoding information (8 Kbytes, encoding/decoding information for transmission of network information to a corresponding device is transmitted while being inserted in binary number row), and the transmission state (4 bits, the provision of the state information such as 'whether of transmission success', 'transmission completion', 'in transmission').

In the communication protocols used in the embodiment of the invention, in the case that the transmission information part has a data size of 4 MB or less, for available data processing, un-filled areas in the corresponding field all are filled with null bits, thereby smoothing data parsing and processing.

FIG. 5 is an algorithm for coping with the case where transmission information is changed in its type according to the present invention.

In FIG. 5, the type of transmitting information is searched (S50), and a communication protocol to which the information is transmitted is searched (S51).

The information protocol for each type of transmitting information is selected from the information transmission protocol 230 (S52). During duplex communication, it is determined whether the type of the transmission information is changed or not (S53), and if not, transmission is continuously carried out (S55).

If the type of transmission information is changed, transmission information is re-configured through selecting an information transmission protocol suitable to the changed information from the information transmission protocol 230 (S54). If transmission information is not changed, the changed information is transmitted (S55), and if transmission information is changed again, the former steps S52 to S54 are repeated.

The present invention can be realized such that computer-readable codes are provided in a computer-readable recording medium. That is, the computer-readable recording medium includes all types of recording device readable by a computer system, such as, e.g. a hard disc, ROM, RAM, CD-ROM, etc.

Although preferred embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

As set forth before, the intelligent agent system according to embodiments of the invention automatically configures the communication connection without complicated process by the communication mates for the communication connection, and intelligently configures and executes the information transmission protocols and output interfaces for information expression, thereby accomplishing fast, convenient communication.

Furthermore, the agent system checks whether or not the communication protocol or the communication program capable of communicating with the counterpart exists in the computing device itself through searching the respective database sections and the communication protocols, and if not, automatically searches and downloads the required communication protocol and program from the corresponding device, the Internet, or local area network, thereby achieving intelligent communication.

The invention claimed is:

1. A first computing device including a processor and a memory, comprising:
   a database unit configured to store device information of a second computing device, the device information indicating network devices installed on the second computing device and applications supported by the second computing device, the database unit comprising:
      a device information database section configured to store the network devices supported by the second computing device, the device information database section further configured to store system configurations and system information of the second computing device; and
      an interface information database section configured to store information on types and states of application executable on the second computing device, the interface information database section configured to store types of media or mode of media accessible by each application in the second computing device;
   an interface-determination unit configured to select an application executable on the first computing device from a plurality of applications to communicate with the second computing device based on the stored device information of the second computing device and a state of one or more applications on the first computing device, wherein the interface-determination unit is further configured to reference information in the device information database section and the interface information database section to select the application;
   a transmission protocol determination unit configured to select a transmission protocol for establishing bidirectional information transmission between the selected application of the first computing device and a counterpart application of the second computing device; and
   a communication protocol determination unit configured to select a network device on the first computing device and a communication protocol for establishing communicating with the second computing device over the network device based on the stored device information of the second computing device and the device information of the first computing device, wherein the communication protocol determination unit is further configured to automatically download a module or a driver for establishing communication with the second computing device from the second computing device or the Internet;
   wherein the states of application comprise (i) performance of the application, (ii) a size of information transmitted by the application, and (iii) the state of the transmission protocol.

2. The first computing device according to claim 1, wherein the information transmission protocol includes: (i) protocols specifically configured for operation with one or more applications and (ii) protocols dedicated to predetermined categories of media.

3. The first computing device according to claim 2, wherein the transmission protocol determination unit is configured to select another transmission protocol responsive to detecting change in type of information transmitted between the first computing device and the second computing device.

4. The first computing device according to claim 1, wherein the communication protocol determination unit is configured to generate and store a communication protocol adapter which is a collective set of protocols for communicating with more than one network device in the second computing device.

5. The first computing device according to claim 1, wherein the communication protocol is lower in level that the transmission protocol.

6. The first computing device according to claim 1, wherein the plurality of applications comprise at least one of a web browser, chatting program, instant messenger and voice communication program.

* * * * *